April 21, 1964  G. CREMER ETAL  3,129,933
TUNNEL FURNACE ARRANGEMENT
Filed Oct. 6, 1959  7 Sheets-Sheet 1

FIG. 1

INVENTORS:
GOTTFRIED CREMER &
HEINZ BEHRENS

BY

PATENT AGENT

FIG. 2

INVENTORS:
GOTTFRIED CREMER &
HEINZ BEHRENS

PATENT AGENT

April 21, 1964     G. CREMER ETAL     3,129,933
TUNNEL FURNACE ARRANGEMENT
Filed Oct. 6, 1959     7 Sheets-Sheet 4

INVENTORS:
GOTTFRIED CREMER &
HEINZ BEHRENS

BY

PATENT AGENT

April 21, 1964 G. CREMER ETAL 3,129,933
TUNNEL FURNACE ARRANGEMENT
Filed Oct. 6, 1959 7 Sheets-Sheet 5

INVENTORS:
GOTTFRIED CREMER &
HEINZ BEHRENS

BY

PATENT AGENT

April 21, 1964   G. CREMER ETAL   3,129,933
TUNNEL FURNACE ARRANGEMENT
Filed Oct. 6, 1959   7 Sheets-Sheet 6

INVENTORS:
GOTTFRIED CREMER &
HEINZ BEHRENS

BY

PATENT AGENT

INVENTORS:
GOTTFRIED CREMER &
HEINZ BEHRENS

PATENT AGENT

3,129,933
TUNNEL FURNACE ARRANGEMENT
Gottfried Cremer, 6 Steyrer Weg, and Heinz Behrens, 19 am Weidenpesch, both of Cologne-Junkersdorf, Germany
Filed Oct. 6, 1959, Ser. No. 844,759
Claims priority, application Germany July 23, 1959
10 Claims. (Cl. 263—28)

The invention relates to a process for the operation of tunnel furnaces with oil burners of the type of so-called impulse burners, injecting, substantially horizontally and substantially transversely to the longitudinal axis of the furnace, at time intervals, the supply of air taking part in the combustion.

When heating tunnel furnaces for burning ceramic material with heavy oil, particular difficulties occur in respect of the oil burners which are used, as the usual heavy oil burners used for the combustion, with comparatively small quantities of oil are not suitable for a sufficient possibility of adjustment of their burning output. In addition, when using these dispersion burners, particular difficulties therefore occur in many cases, as the burning technical behaviour of the oil has similarly high combustion temperatures directly after the oil passes out of the burner, which necessitates a particular construction as regards the construction of the burner chamber, in order to obviate deleterious actions on the ceramic material to be burnt.

These fundamental difficulties are eliminated by the use of so-called impulse burners. The oil does not pass continuously from these burners and is also not dispersed to such an extent, as is the case in connection with the usual dispersion burners, but is sprayed out stepwise in small quantities. It is thus also possible, with small passing quantities, to obtain a comparatively wide range of adjustment, in that either at each impulse the injected quantity is varied, or the number of impulses is varied according to the time unit. As in these burners, practically no dispersion occurs, as is the case with dispersion burners, there are avoided at the same time the high combustion temperatures at the burner outlet. The oil sprayed in is burnt only during its movement in the combustion chamber.

These step-wise operating or so-called impulse burners have hitherto only been used in a vertical arrangement in tunnel furnaces and this in such a manner that they were arranged in the arch of the tunnel furnace and inject vertically from top to the bottom in the furnace.

This known burner arrangement, however, has the disadvantage that the burners, located in the arch and thus at the point of the furnace passage which is the most difficult of access and which are exposed to the highest temperatures which obtain in the furnace cross-section and therefore must be replaced more frequently, are difficult to watch and maintain. Further, the spraying of the top produces difficulties for the control of the temperature distribution in the interior of the furnace passages, particularly because the direct action of the heating in this case on the intermediate walls between the burning truck or the poor utilisation of the furnace space for this purpose is restricted to the available space in the structure.

In addition, this method of heating requires the usual shock-wise operation of the furnace, wherein the burning trucks are advanced at intervals of for example of one hour's duration by a wagon length. During the advance the burners must be switched off by the known arrangement, as otherwise they act in a damaging manner on the set which would otherwise act deleteriously directly on the burning truck which is moved past it.

By the invention these disadvantages of the known impulse burner arrangement are eliminated and a heating for tunnel furnaces is provided, which fulfills all the requirements necessary for the purpose but fulfills all the requirements, particularly also the desired adjustable uniform temperature distribution of each furnace passage cross-section in a very advantageous manner.

Further, by reason of its preferred form of construction, the invention provides new possibilities for a commercial course of the burning process of the injected oil.

These results are obtained according to the fundamental idea of the invention by the fact that the impulse burners are not arranged vertically burning, in the arch, but are so arranged in at least one, as a rule, and preferably in both side walls of the furnace passage, that they spray into the interior of the furnace passage entirely or substantially in a horizontal direction.

With a burner arrangement of this character it is possible, by suitably dimensioning the nozzles and the injection thickness, to obtain a practically suitable, if desired, very wide projection width of the separate drops, whilst on the path, followed by the drops, their complete combustion takes place very uniformly, without the drops falling prematurely to the bottom.

The arrangement of the impulse burners according to the invention also provides a far-reaching independency from the dimensions in width of the furnace passage, which, particularly when the burners operate from both sides, can be increased up to twice the projecting width of the separate burner.

Further, the burners now no longer require, as previously, to be provided at accurate locally defined points of the furnace passage; namely the intermediate spaces between the stationary burning trucks but can act on a hollow space, formed underneath the platform on which the charge is built up, in that they inject preferably from both sides of the furnace passage. In this case, each burning truck can be provided with a plurality of uniformly distributed burners, whereby a particularly uniform heating is obtained.

The new burner arrangement also permits of a practically continuous forward movement of the burning trucks with continuous further burning of the impulse burners and thus the utilisation of all the known advantages of this method of operation.

With particular advantage the supply of air for combustion to the burners is combined with the injection operation, whereby there is obtained a considerable reduction of the necessary air for combustion required and a particularly exact influencing of the composition of the furnace atmosphere results.

By a further improvement of the preceding fundamentally explained idea of the invention, the hollow spaces, provided underneath the burning truck plateau, into which the impulse burners spray transversely to the longitudinal axis of the burning trucks, are formed as burning chambers extending throughout the entire width of the burning chambers, which are closed completely, except their lateral inlet openings for the oil streams coming from the burners and the necessary quantity of air and upper outlet openings for the combustion gases.

When the process is to be carried out with practically continuous operation of the tunnel furnace, then according to a further development of the invention, the surfaces provided for the oil streams are so shaped that the impinging points of the oil streams impinging on these surfaces at an angle, at which the final combustion of the oil takes place, progress further forwards in accordance with the forward movement of the burning trucks away from the nozzle mouth of the associated burner and after reaching a furthest removed point are again moved backwards towards the nozzle mouth.

In this connection by constructing the burner chambers at right-angles to the longitudinal axis of the burner truck, the injecting direction of the impulse burners may be inclined somewhat relatively to the vertical to the longitudinal axis of the tunnel furnace or by arranging the burning chambers at an inclination to the longitudinal axis of the furnace, the injection direction of the impulse burners may be allowed to extend substantially at right-angles to the longitudinal axis of the furnace.

The heating process according to the invention, by further development of its fundamental idea in the direction of a still better development of the heating, particularly also in the case of widening the furnace passage, which hitherto was not conceivable, can be improved by the use, by the possibility provided by the impulse burner heating, of projection distances of the intermittent oil streams of from 3 to 6 or even more meters.

This is obtained, according to a further feature of the invention, by the fact that the burning chambers of the burning vehicles passing from one side to the other of the furnace passage have additional impinging surfaces for the oil streams in plan, in relation to the single case arrangement, by which the points at which the oil stream or drops impinge, can be displaced discontinuously in spite of the forward movement of the burning trucks at a uniform speed.

A burning truck particularly suitable for carrying the process into effect according to the invention is characterised by a plurality of horizontally extending burning chambers under the burning depositing surface, with the exception of inlet openings at the side and closed towards the top for the burning material, which are closed completely to the combustion gases.

In this connection it is not necessary that in each burning chamber only one impulse burner injects from each side. The arrangement may also be such that a number of burners inject into the burning chamber. It is also not necessary that left and right impulse burners are provided simultaneously but on the contrary it is possible for the burners to be provided only on one side or alternatively on one side and on the other.

When using oil and particularly heavy oil for heating tunnel furnaces for burning ceramic material or the like, it has hitherto been found particularly difficult and in many cases has proved impossible to carry out with reducing atmospheres. By the proposal according to the invention the reducing burning can now be carried out in a simple manner, as by a suitable measurement of the combustion air, which is supplied to the burning chambers in the burning vehicle, an incomplete combustion of the oil in these chambers and thus the necessary CO content can be obtained in the furnace atmosphere.

The further development of the process according to the invention can be effected fundamentally for example, that in the burning chambers extending throughout local structures are provided, which preferably, simultaneously for a separate purpose described hereinafter, are so constructed that thereby not only the position of the meeting point of the oil streams but also a directing action is applied to the combustion gases.

These insertions to be provided at suitable positions of the longitudinal extensions of the burning chambers, may be formed, for example, of quadrant shape and extend over a portion or even the entire height of the burning chambers and then provide impact surfaces for the oil streams transversely or at an angle thereto, so that in the vicinity of the impact point of the oil streams and the main combustion is retarded to a large extent by the shape of the inserted definite interval, in order that in the amount of the further forward movement of the burning vehicle, is again brought forward as soon as the oil stream no longer meets the insertions.

According to a preferred form of construction the insertions are formed, from the bottom of the burner chambers, only over a portion of the height thereof, either from one side wall to the other or also by leaving an intermediate space between bars, triangular in cross-section, extending between inserted portions and the side wall, of which the side surfaces simultaneously exert the above-indicated directing action.

According to another possibility, the above action can be obtained by forming the bottom of the burning chamber, for example by causing it to rise and then again to fall, so that it acquires a flat triangular cross-section.

A further of the numerous existing possibilities is that in the smooth side walls of the burning chambers are provided openings, on the walls of which are directed transversely to the length direction, the oil streams impinging or spraying a number of times.

By the planned arrangement of the points at which the main combustion always takes place, it is possible to obtain any desired action, the direction of the comparative moderation of the heating or also its adaptation to the method of charging the burning trucks, if necessary a different charging in the transverse direction.

With the same or similar result the wedge-shaped pointed end zones of the partition walls, separating the burning chambers from one another, instead of ending at the side walls of the burning trucks, can be caused to spring slightly back or if necessary their points are flattened, so that a separate heating of side portions of the burning vehicles takes place but whilst avoiding the disadvantage which by the provision of such flaps, instead of taking place inwardly in the flight of the lateral limits of burning trucks, that there a portion of the oil prematurely passes off and is lost unused or effects an unfavourable heating of the burner itself.

As particularly suitable may be shown of forming the head surfaces of the partition walls in the spraying range with a recess preferably in the form of a half-round hollow throat.

The construction of the burner chambers according to the invention permits in a particularly advantageous manner, the purpose of utilising relatively to one another on both sides of the tunnel furnace the displaced arrangement of the impulse burners, namely allowing each burner to act separately over the whole width of the burning chamber and to displace the points at which its action develops according to plan whilst considering the conditions progressively of the separate case according to predetermined rhythm.

An additional particular advantage which is obtained by the construction of the burning chambers according to the invention but which has nothing to do with the actual heating of the tunnel furnace, resides therein that the correcting action of the inserted structures on the furnace atmosphere permits, also in the pre-heating and the cooling zones of adjusting and rendering uniform the temperature distribution, in that by the inserted portions the outflowing circulating air flowing in, in the known manner, at both sides and in the central zone flowing towards the furnace structure and in the central region, flows to the furnace arch, whilst flowing through the revolving outflowing air of the structure in uniform distribution to the upper slot openings of the burning chambers and is conducted through these. In a particularly advantageous manner this directing action is then obtained when a plurality of triangular shaped insertions of a height increasing towards the centre increasing in height towards the middle are provided.

A further, if necessary additional possibility of the construction of the burning trucks according to the invention resides therein, that the burning chambers are reduced towards the opposite side of the vehicle, whilst either the limiting walls extending transversely to the longitudinal axis of the vehicle are assembled as a zig-zag separating edge structure extending under the operating platform, or with the object of a tunnel furnace have only a heating on one side of the tunnel furnace, this burning chamber being reduced inwardly and leaving only an opening towards one side of the burning wagon.

The accompanying drawings show examples of construction of preferred forms of construction of the tunnel furnace for carrying out the process of the invention and of the burner vehicle arrangement necessary for this purpose.

FIG. 11 shows a side elevation and

FIG. 12 in vertical section, the burning truck according to FIG. 10.

Figure 1:
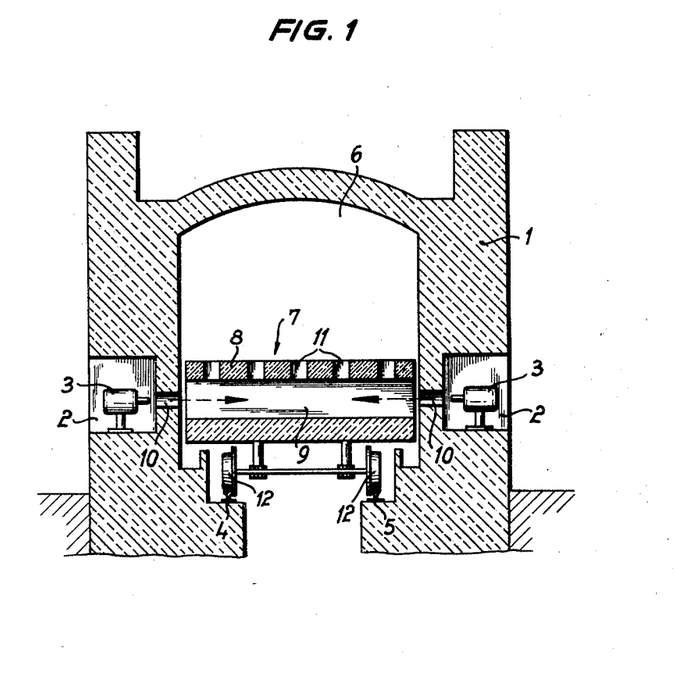
FIG. 1 is a vertical section of a tunnel furnace for carrying out the process of the invention.

In FIG. 1, 1 indicates the side walls of a tunnel furnace, which at 2 are provided with recesses for the mounting of impulse burners 3. In the furnace there runs on rails 4, 5 the burning truck 7, loaded with burning material, which in the example of construction is shown in section. It will be seen that this burning truck is provided under the loading surface 8 with transversely extending chambers 9, for the burning material, into which the impulse burners 3 spray from the wall openings 10. These chambers, with the exception of the injection openings and the upwardly open openings 11, are closed on all sides, as will be seen from the cross-section in FIG. 2.

Figure 3:
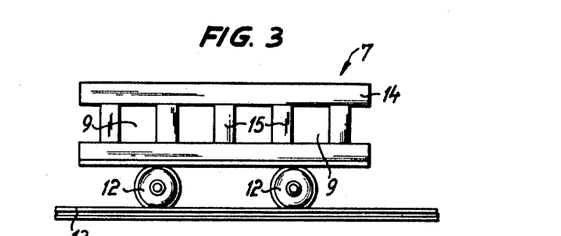
FIG. 3 show a first form of construction of a burning truck with burning chambers formed underneath the platform supporting the charge.

FIG. 3 shows a burning truck 7 running by its wheels 12 on rails 13, with the load receiving surface 14 and the separate transverse walls 15, 15 for forming the chambers.

Figure 2:
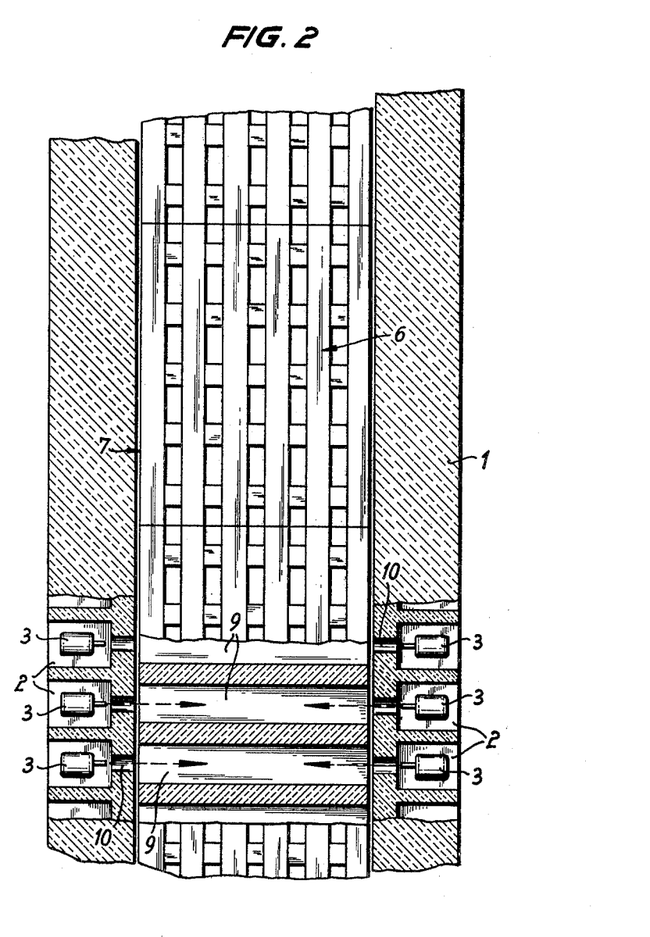
FIG. 2 is a horizontal section of a tunnel furnace according to FIG. 1.
Figure 4:
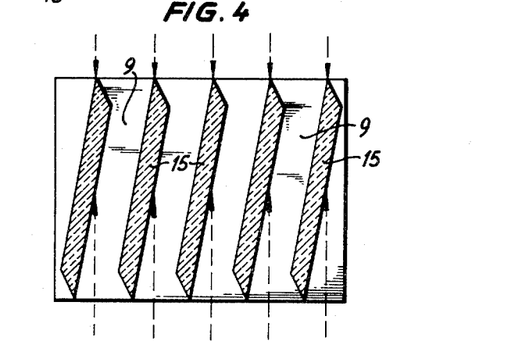
FIGS. 4 and 5 show two further forms of construction of the burning chambers formed on the burning truck.
Figure 5:
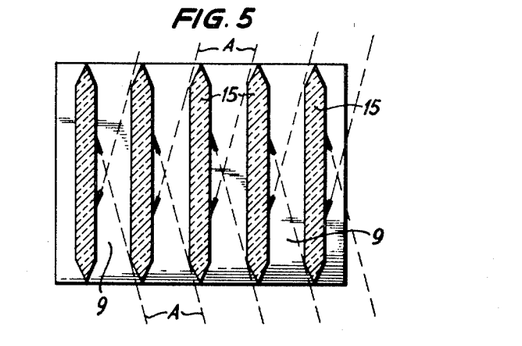

In order, with the tunnel furnace arrangement illustrated in FIGS. 1 to 3, to provide a continuous forward movement of the burning truck and thus simultaneously a possible favourable distribution of the heat over the entire width of the tunnel furnace, it is possible either to incline the burner chambers 9, as shown in FIG. 4, slightly against the vertical towards the burner chamber wall, or the burners themselves are slightly inclined as indicated by the arrows A in FIG. 5. In both cases, during the movement of the burning trucks, the spraying point of the quantity of oil sprayed in travels backwards and forwards over the width of the burning truck and there is thus obtained a very uniform distribution of the heat over the width of the tunnel furnace. Preferably the edges of the sides of the furnace walls are somewhat inclined as shown in these figures.

Figure 6:
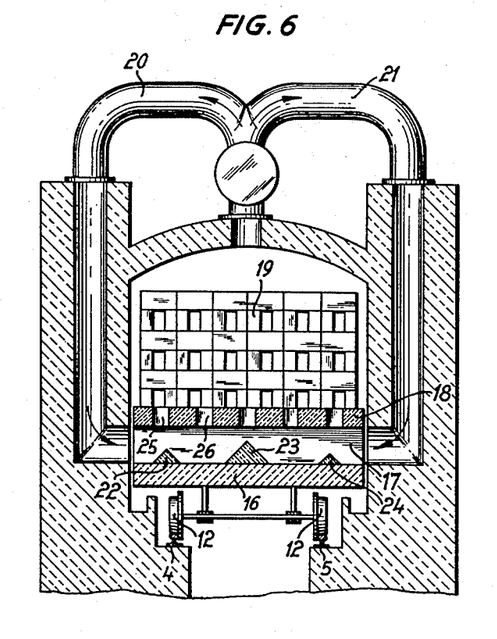
FIG. 6 is a cross-section through the furnace passage of a modified form of construction of a tunnel furnace according to the invention.

FIG. 6 shows a cross-section through the furnace passage of a modified form of construction of the tunnel furnace constructed according to the invention, in order to show all the essential features of the principle of the invention, through the preheating zone, in which the furnace atmospheres are circulated in the usual manner in two countercurrent streams.

16 is a burning truck, 17 indicates a plurality of burning chambers extending transversely across the furnace passage underneath the supporting surface 18 for the fitting 19.

The furnace atmosphere whirled about in 21 is conducted through the structures 22, 23, 24, triangular in cross-section, provided on the bottom of the burning chambers 17 in a plane to the middle increasing in height to the slots 25, 26 which permit, in the burning zone, the outflow of the combustion gases from the burning chambers and through the seating d.

The action of the structures 22, 23, 24 in the sense of the planetary positioning of the meeting point of the oil streams in the burning zone requires no particular explanation.

Figure 7:
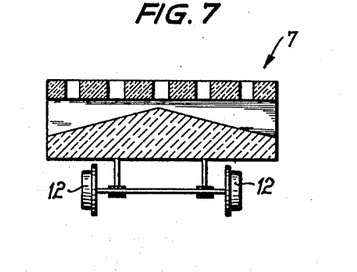
FIG. 7 is a section of a somewhat modified burning truck constructed according to the invention.

FIG. 7 shows in section solely through the burning trucks, another possibility for the development of the fundamental idea of the invention, namely a continuous constriction of the combustion chamber cross-section up to the middle by flattened triangular shaping of the bottom of the burning chamber.

Figure 8:
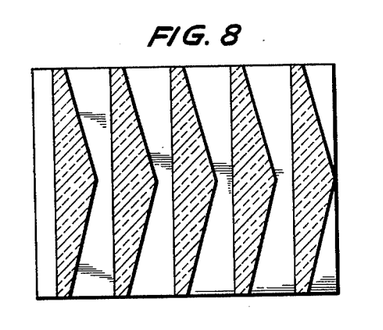
FIGS. 8 to 10 are horizontal sections of further modified forms of construction of burning trucks according to the invention.

FIG. 8 shows in plan a possibility, through, in horizontal section, a shallow triangular construction of the separating walls of the burning chambers, the position of the meeting point of the oil streams progressing with the movement of the vehicles and simultaneously how to utilise the actions resulting from the progressive reduction of the cross-section of the burning chamber.

Figure 9:
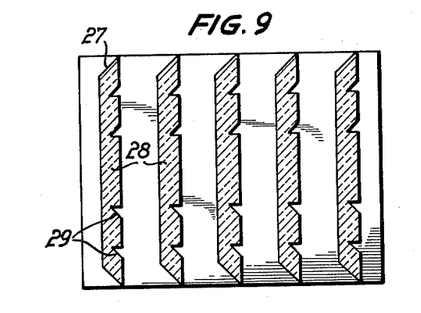

FIG. 9 shows, also in horizontal cross-section through all the burning chambers, a form of construction, which is particularly suitable for heating by means of adjacently placed, that is to say on burners, on a trapdoor, on both sides of the furnace passage. In this form of construction there are provided under the wedge-shaped form of the end zones 27 of the partitions 28, triangular shaped recesses 29 within which there is effected a temporary moderation of the heating as a result of the longer stopping period of the impinging point of the oil stream.

Figure 10:
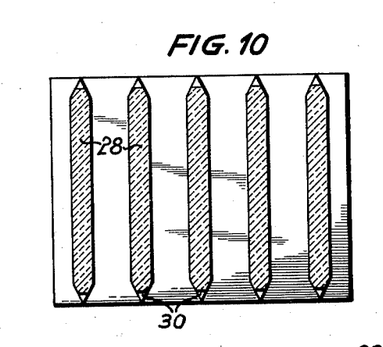

FIG. 10 shows in correspondence with the illustration in FIG. 9, the flattening and the resulting setting back of the points of the partition walls 28 at 30.

Figure 11:
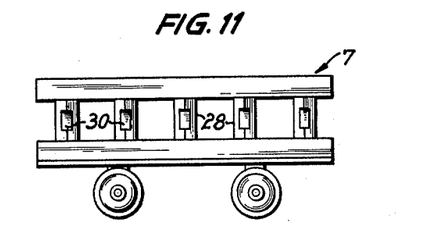
Figure 12:
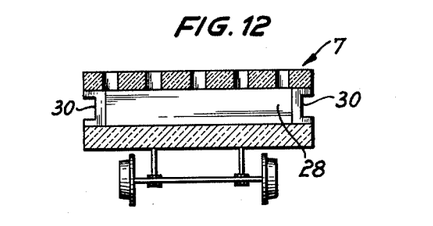

FIG. 11 is a side elevation and FIG. 12 a section of FIG. 10. From these figures it will be seen that the flattening and return movement preferably only takes place at the level of the sprays of the burners, where it is alone effective.

Figure 13:
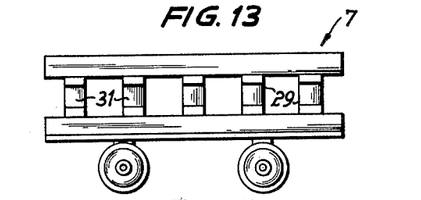
FIGS. 13 to 15 show in side elevation, vertical section and horizontal section, a further form of construction of the burning truck.
Figure 14:
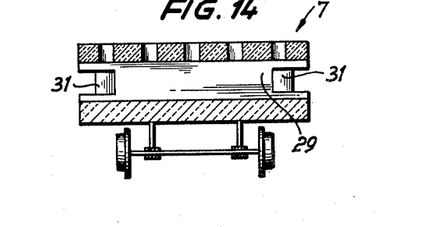
Figure 15:
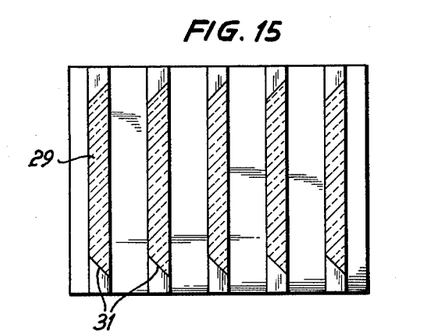

FIGS. 13 to 15 show at 31, without it being necessary in this respect to give further explanation, the hollow cone-like construction of the front sides of the intermediate wall 29.

The construction of the burning chambers is also, by reason of complete separation from one another of the burning chambers in a lateral direction, particularly advantageous for a selective or locally different, namely oxidising and reducing heating. When it does not depend on this possibility, it is entirely within the scope of the invention, that between the burning chambers connections are provided, preferably in uniform spacing, so that in extreme cases there is obtained a construction of the intermediate walls from correspondingly shaped technically called "Elephant feet" quadrants in spaced apart, side by side arrangement.

Figure 16:
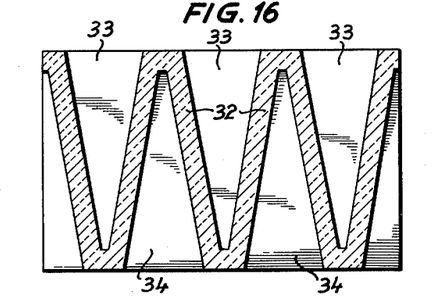
FIGS. 16 and 17 show horizontal sections with burning chambers reduced in the horizontal direction.

FIG. 16 shows in horizontal section a burner truck construction in which extends, transversely to the longitudinal axis of the vehicle, a zig-zag shaped wall 32, which subdivides the space provided for the burning chambers under the operating platform into reduced successive burning chambers 33 and 34, open towards different sides, whilst the firing of the tunnel furnace is effected from both sides. The burners or both sides of the tunnel furnace are thus relatively displaced, so that the burners of one side are always set spaced to the burners of the other side.

Figure 17:
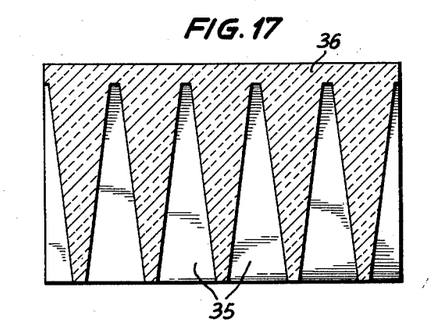

FIG. 17 shows a form of construction of a burning truck with reducing burning chambers 35 opening only on one side with correspondingly shaped partitions 36 which are then used, when the furnace is only to be fired from one side.

In some burning operations and particularly when combustible materials of considerably varying dimensions are to be burnt simultaneously, it may be particularly advantageous and probably necessary, to effect the feed not with a uniform speed but on the contrary in combination with the construction of the burning chambers, to so vary the spraying points travelling backwards and forwards over the width, that the necessary "spraying time factor" is always obtained at the desired points.

It will be understood that the invention is not limited to the forms of construction hereinbefore described in detail and illustrated in the drawings, but that numerous modifications are possible without departing from their fundamental ideas.

We claim:

1. A furnace arrangement, comprising, in combination: a tunnel furnace having a longitudinal axis; intermittently operated impulse burners arranged at at least one side of said tunnel furnace for spraying oil in a horizontal direction transverse to said longitudinal axis; and carrier means arranged for movement through said tunnel furnace in the direction of said longitudinal axis thereof, said carrier means being formed with a support having a support surface for supporting material to be heated and upwardly extending passages leading to and opening at said support surface, and with combustion chambers arranged below said support surface and extending throughout the entire width of said carrier means, said combustion chambers communicating with said upwardly extending passages leading to and opening at said support surface, said combustion chambers being otherwise open only laterally of said carrier means for allowing said impulse burners to spray oil into said combustion chambers, whereby the combustion of oil and air takes place in said combustion chambers, said combustion chambers being bounded by vertical partition walls having lateral edges bevelled in at least one direction.

2. A furnace arrangement as defined in claim 1 wherein said partition walls are inclined relative to said longitudinal axis.

3. A furnace arrangement, comprising, in combination: a tunnel furnace having a longitudinal axis; intermittently operated impulse burners arranged at at least one side of said tunnel furnace for spraying oil in a horizontal direction transverse to said longitudinal axis; and carrier means arranged for movement through said tunnel furnace in the direction of said longitudinal axis thereof, said carrier means being formed with a support having a support surface for supporting material to be heated and upwardly extending passages leading to and opening at said support surface, and with combustion chambers arranged below said support surface and extending throughout the entire width of said carrier means, said combustion chambers communicating with said upwardly extending passages leading to and opening at said support surface, said combustion chambers being otherwise open only laterally of said carrier means for allowing said impulse burners to spray oil into said combustion chambers, whereby the combustion of oil and air takes place in said combustion chambers, said combustion chamber containing distributing means for exerting a directing action on combustion gases formed by the combustion of oil and air, said distributing means forming additional impinging surfaces in the path of oil being sprayed by said impulse burners for distributing the heating effect throughout the width of said carrier means.

4. A furnace arrangement as defined in claim 3 wherein said distributing means comprise means for reducing the cross section of said combustion chambers in the middle thereof.

5. A furnace arrangement as defined in claim 3 wherein said distributing means comprise an insert of triangular cross section arranged in said combustion chambers, said insert having a height substantially less than its base.

6. A furnace arrangement as defined in claim 3 wherein said distributing means comprise a plurality of inserts of triangular cross section, said inserts being arranged along the width of said combustion chambers and being of increasing size toward the middle of said combustion chambers.

7. A furnace arrangement as defined in claim 3 wherein said distributing means comprise partition walls bounding said combustion chambers, said partition walls having in a horizontal plane a triangular cross section.

8. A furnace arrangement as defined in claim 3 wherein said distributing means comprise partition walls bounding said combustion chambers, said partition walls being formed with a plurality of triangular recesses, one side of each recess being inclined relative to the direction in which said impulse burners inject oil.

9. A furnace arrangement as defined in claim 3 wherein said distributing means comprise partition walls bounding said combustion chambers, said partition walls having wedge-shaped lateral edges formed with inward flat recesses.

10. A furnace arrangement as defined in claim 9 wherein said recesses are at the level at which said impulse burners spray oil.

References Cited in the file of this patent

UNITED STATES PATENTS

| | | |
|---|---|---|
| 2,386,835 | Beatty | Oct. 16, 1945 |
| 2,605,091 | Socke | July 29, 1952 |
| 2,623,579 | Furkert | Dec. 30, 1952 |
| 2,695,662 | Hagelin et al. | Nov. 30, 1954 |
| 2,715,436 | Lafferentz et al. | Aug. 16, 1955 |
| 2,899,189 | Matis et al. | Aug. 11, 1959 |
| 2,982,530 | Drakengren | May 2, 1961 |

FOREIGN PATENTS

| | | |
|---|---|---|
| 498,813 | Germany | Sept. 26, 1930 |